(12) United States Patent
Meggiolan

(10) Patent No.: US 11,085,562 B2
(45) Date of Patent: Aug. 10, 2021

(54) HYDRAULIC SEALING BODY FOR BICYCLE BRAKING SYSTEMS AND HYDRAULIC HOSE ASSEMBLY FOR BICYCLE BRAKING SYSTEMS

(71) Applicant: Campagnolo S.r.l., Vicenza (IT)

(72) Inventor: Mario Meggiolan, Creazzo (IT)

(73) Assignee: Campagnolo S.r.l., Vicenza (IT)

( * ) Notice: Subject to any disclaimer, the term of this patent is extended or adjusted under 35 U.S.C. 154(b) by 336 days.

(21) Appl. No.: 15/991,212

(22) Filed: May 29, 2018

(65) Prior Publication Data

US 2018/0356012 A1 Dec. 13, 2018

(30) Foreign Application Priority Data

Jun. 13, 2017 (IT) .......... 102017000065297

(51) Int. Cl.
| | | |
|---|---|---|
| *F16L 13/14* | (2006.01) | |
| *F16L 33/207* | (2006.01) | |
| *B29D 23/00* | (2006.01) | |
| *B62L 3/02* | (2006.01) | |
| *B60T 17/04* | (2006.01) | |

(Continued)

(52) U.S. Cl.
CPC .......... *F16L 13/141* (2013.01); *B29D 23/003* (2013.01); *B60T 17/043* (2013.01); *B62L 3/023* (2013.01); *F16J 15/025* (2013.01); *F16L 33/18* (2013.01); *F16L 33/2076* (2013.01); *F16L 33/224* (2013.01)

(58) Field of Classification Search
CPC ......... F16L 33/207; F16L 33/18; F16L 33/22; F16L 33/223; F16L 33/00; F16L 13/142; F16L 13/141; B60T 17/043; B60T 17/04; B62L 1/005

USPC ....... 285/397, 343, 248, 256, 259, 353, 112, 285/382, 382.1, 382.2
See application file for complete search history.

(56) References Cited

U.S. PATENT DOCUMENTS 1,704,003 A * 3/1929 Johnson .................. F16L 17/04
277/608
1,783,410 A * 12/1930 Cowell ..................... F16L 3/04
285/236

(Continued)

FOREIGN PATENT DOCUMENTS

| CN | 2274167 Y | 2/1998 |
|---|---|---|
| CN | 101676172 A | 3/2010 |

(Continued)

OTHER PUBLICATIONS

Italian Search Report and Written Opinion in Italian Application No. 102017000065297, dated Feb. 6, 2018, with English translation.

(Continued)

*Primary Examiner* — Aaron M Dunwoody
(74) *Attorney, Agent, or Firm* — Volpe Koenig

(57) ABSTRACT

A hydraulic sealing body including a radially inner surface defining a through-cavity and an annular element projecting in a radially inner direction from said radially inner surface is disclosed herein. The annular element includes a first annular abutment surface configured to receive in contact relationship a head portion of a coupling terminal, and a second annular abutment surface, axially opposite to the first, configured to receive in contact relationship an axial end of a hydraulic hose.

18 Claims, 9 Drawing Sheets

(51) Int. Cl.
*F16J 15/02* (2006.01)
*F16L 33/18* (2006.01)
*F16L 33/22* (2006.01)

(56) References Cited

U.S. PATENT DOCUMENTS

| | | | | |
|---|---|---|---|---|
| 2,319,024 | A * | 5/1943 | Wehringer | F16L 33/225 285/256 |
| 3,496,939 | A * | 2/1970 | Odiaga | A61B 17/1114 606/154 |
| 3,498,648 | A * | 3/1970 | Hallesy | F16L 13/146 285/343 |
| 4,243,254 | A | 1/1981 | Hill | |
| 4,417,755 | A * | 11/1983 | Gittleman | F16L 21/065 285/367 |
| 5,797,627 | A * | 8/1998 | Salter | F16L 31/00 285/239 |
| 6,488,318 | B1 * | 12/2002 | Shim | F16L 19/061 285/322 |
| 8,038,176 | B2 * | 10/2011 | Bowman | F16L 17/04 285/112 |
| 8,424,918 | B2 * | 4/2013 | Gibb | F16L 17/04 285/112 |
| 2002/0180209 | A1 * | 12/2002 | Kariyama | B62L 3/023 285/256 |
| 2003/0001385 | A1 | 1/2003 | Favre et al. | |
| 2007/0187191 | A1 | 8/2007 | Lumpkin | |
| 2008/0250893 | A1 * | 10/2008 | Tsai | F16C 1/14 74/502.4 |
| 2011/0017560 | A1 | 1/2011 | Van Dyke et al. | |
| 2012/0273308 | A1 * | 11/2012 | Uchida | B60T 17/043 188/72.4 |
| 2013/0154260 | A1 * | 6/2013 | Jamison | F16L 21/02 285/374 |
| 2014/0038757 | A1 * | 2/2014 | Kariyama | B62L 3/023 474/101 |
| 2014/0152004 | A1 * | 6/2014 | Ko | B60T 17/043 285/386 |
| 2017/0225669 | A1 * | 8/2017 | Watarai | B62L 3/02 |
| 2017/0267223 | A1 * | 9/2017 | Meggiolan | F16L 19/065 |
| 2019/0009858 | A1 * | 1/2019 | Hujer | B60T 17/043 |

FOREIGN PATENT DOCUMENTS

| | | |
|---|---|---|
| DE | 102011106369 A1 | 1/2013 |
| EP | 1273843 A1 | 1/2003 |
| EP | 3042836 A1 | 7/2016 |
| JP | 2011025920 A | 2/2011 |

OTHER PUBLICATIONS

Chinese Office Action for Application No. 201810600167.X, dated Jan. 20, 2021.

* cited by examiner

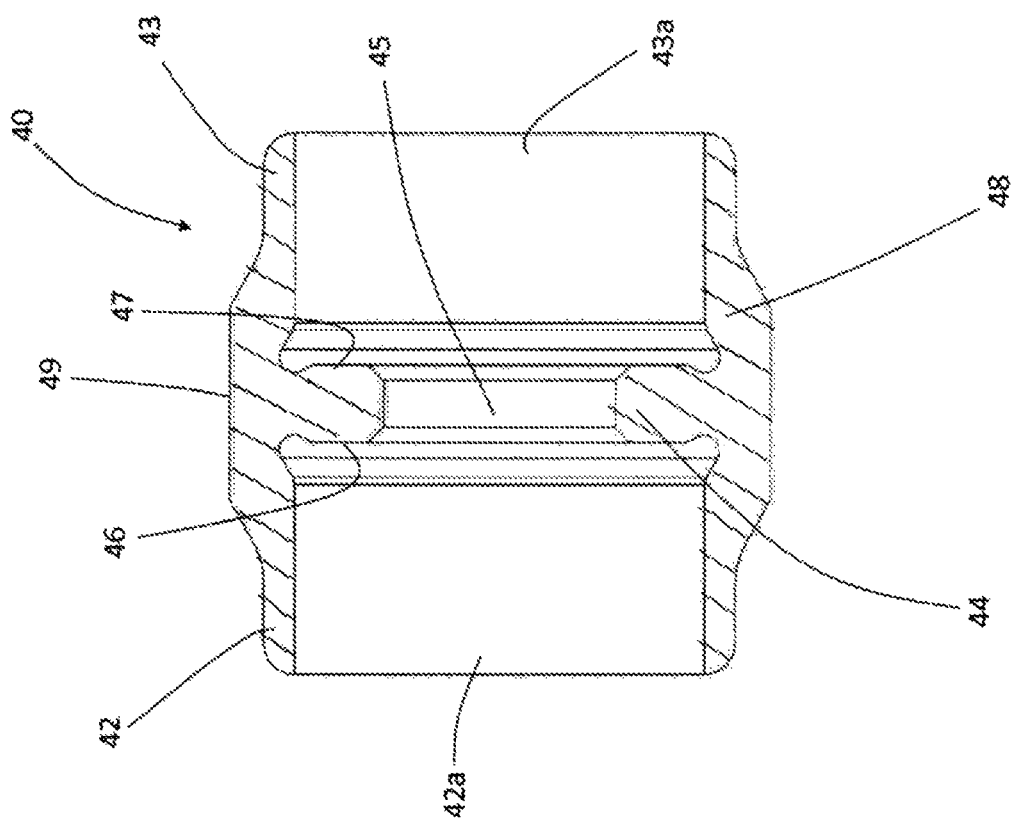
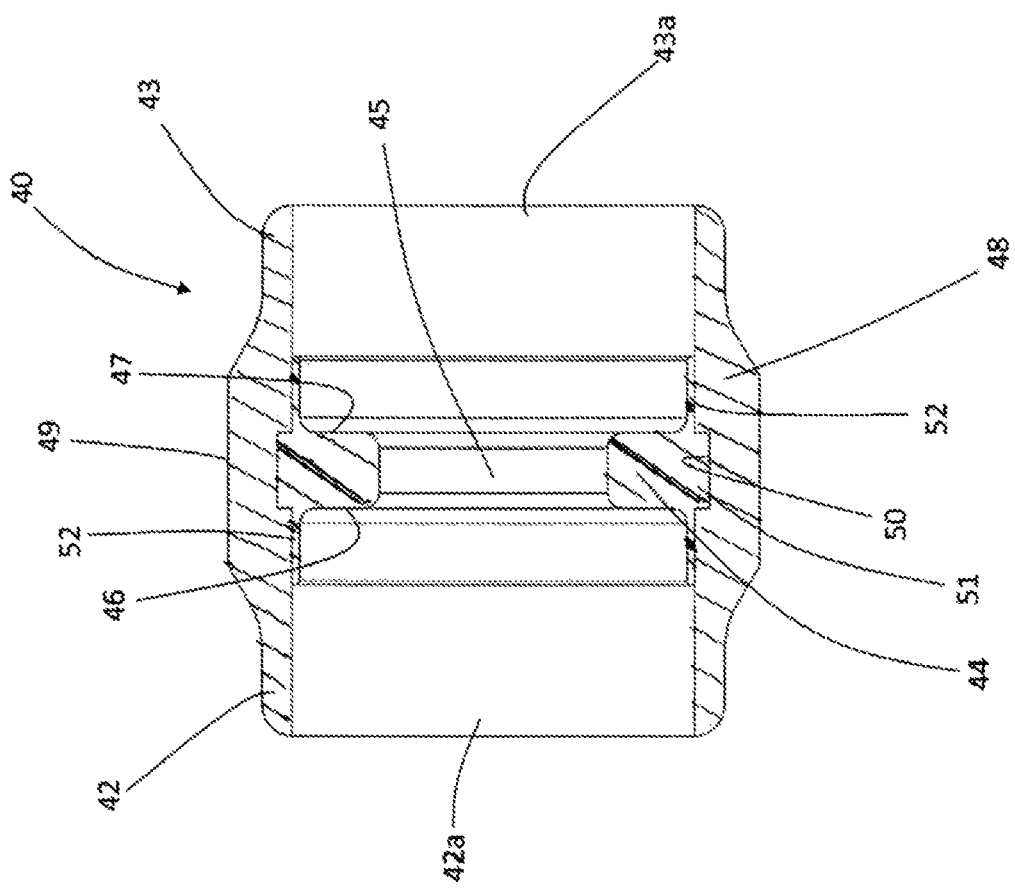

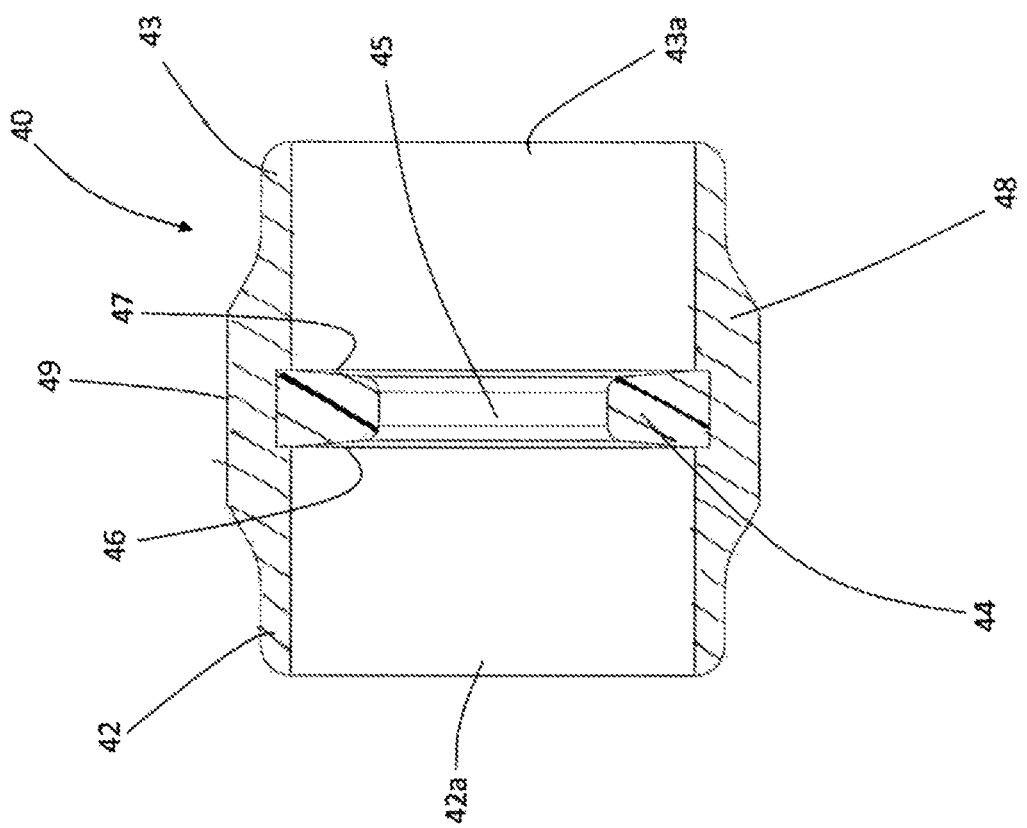
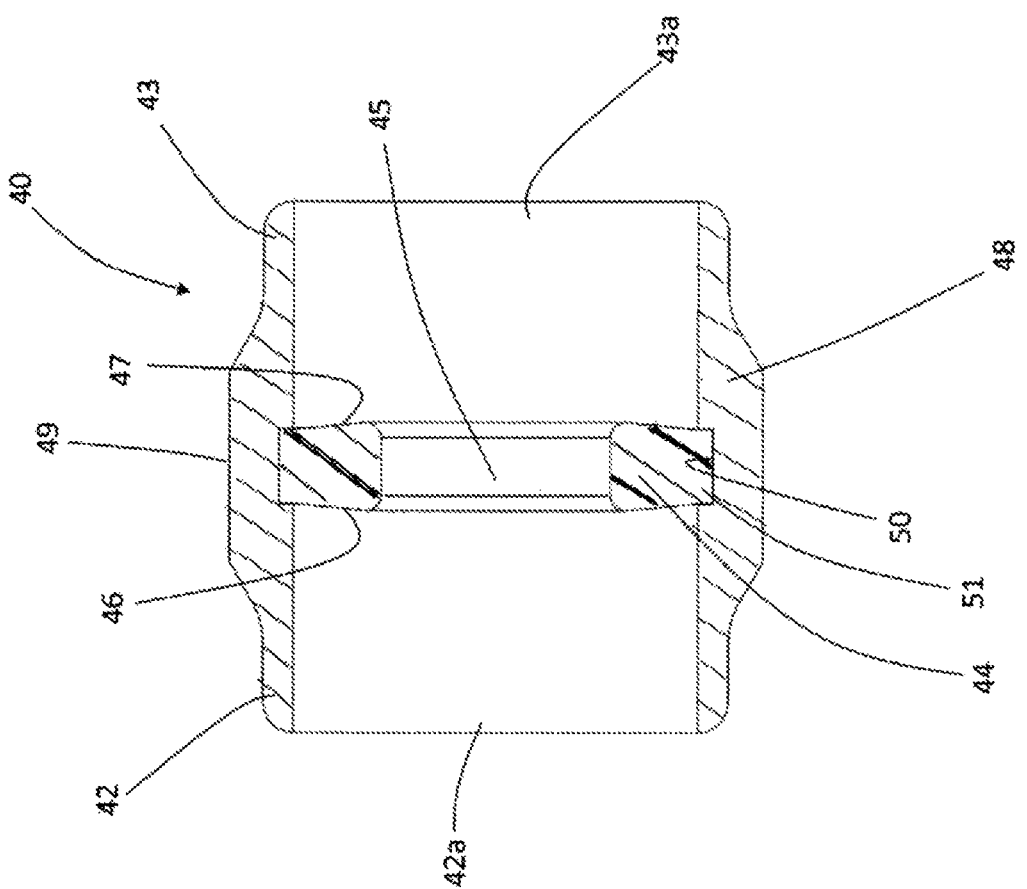

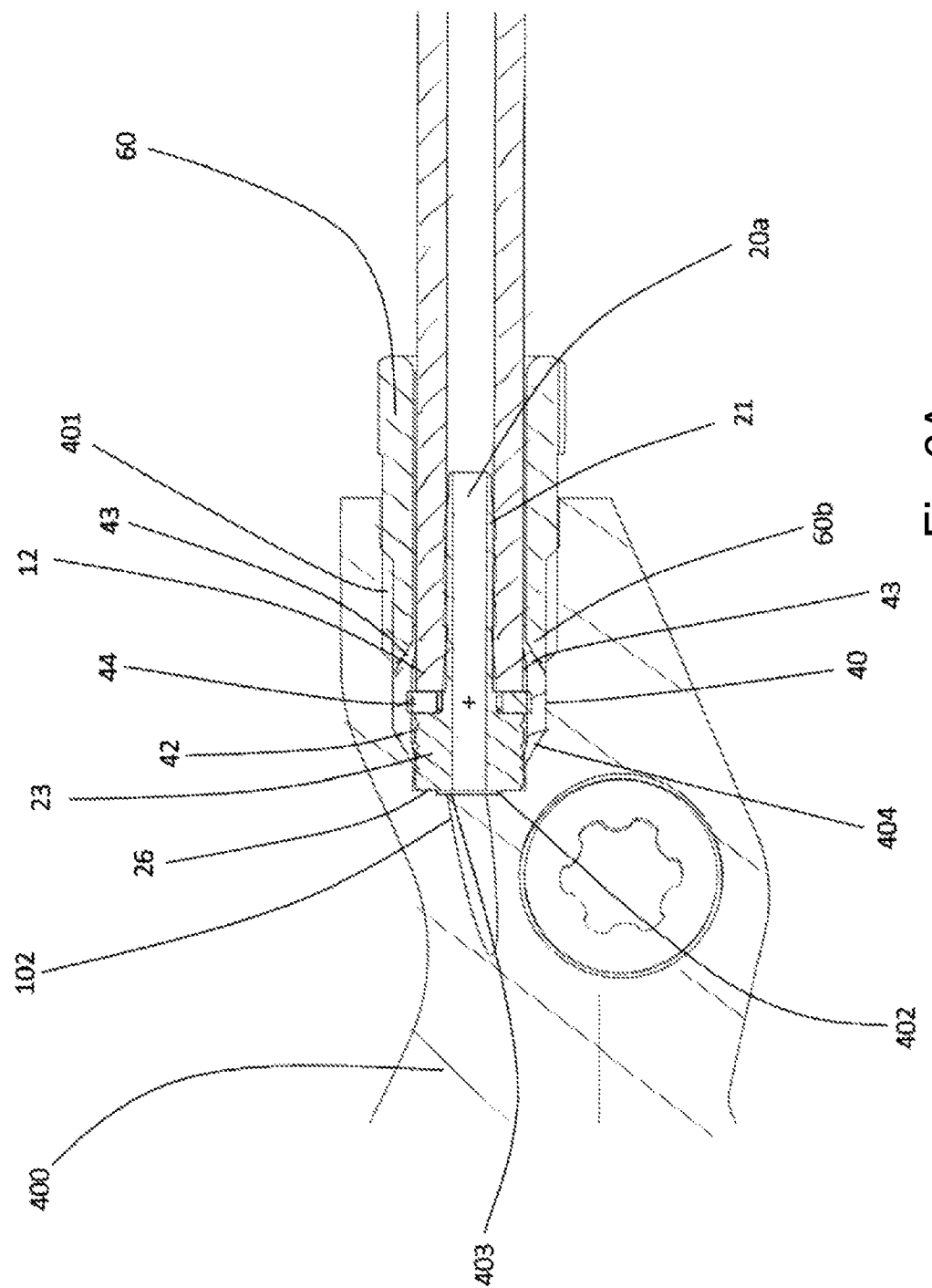

HYDRAULIC SEALING BODY FOR BICYCLE BRAKING SYSTEMS AND HYDRAULIC HOSE ASSEMBLY FOR BICYCLE BRAKING SYSTEMS

CROSS REFERENCE TO RELATED APPLICATION

This application claims the benefit of Italian Patent Application No. 102017000065297, filed on Jun. 13, 2017, which is incorporated herein by reference as if fully set forth.

FIELD OF INVENTION

The present invention relates to a hydraulic sealing body for bicycle braking systems and a hydraulic hose assembly for bicycle hydraulic braking systems.

Preferably, the hydraulic sealing body and the hydraulic hose assembly are intended to be used in a racing bicycle hydraulic braking system.

BACKGROUND

Typically, the installation of bicycle hydraulic braking systems requires the connection of a hose with a component of the hydraulic braking system, like for example another hose or a hydraulic actuator (for example a brake caliper or a brake pump), in order to allow fluid (typically oil) to pass from one hose to another hose, or from a hose to the hydraulic actuator and, consequently, the activation/deactivation of the braking device.

Such a connection is obtained by using suitable connectors that must ensure both the mechanical seal (maintaining the mutual coupling) and the hydraulic seal (absence of fluid leaks) between the hose to be connected and the component of the hydraulic braking system during the entire lifetime of the hydraulic braking system also in the case of repeated mounting and dismounting.

In particular, the hydraulic hose is usually connected to an actuator (or to a connector for the connection with another hose) adopting a hydraulic hose assembly that usually comprises the hydraulic hose itself, a deformable hydraulic sealing body (known in the jargon as "olive"), a coupling terminal (known in the jargon as "needle") and a clamping screw.

The coupling terminal, which comprises an insertion portion and a head, is coupled to a free end of the hydraulic hose so that the insertion portion is contained in the hydraulic hose.

The hydraulic sealing body (the olive) has the function of mechanically holding the head of the coupling terminal in the seat of the actuator or of the connector and of ensuring the hydraulic seal between the hose and the actuator or the connector.

For this purpose, the hydraulic sealing body, made from a hollow body of metallic material such as brass, is inserted in the seat of the actuator or of the connector.

The end of the hydraulic hose with which the coupling terminal has been associated is inserted in the seat so that the head of the coupling terminal inserts in the hydraulic sealing body.

The clamping screw, coaxial with the hydraulic hose, is screwed into the seat of the actuator or of the connector so as to contact the hydraulic sealing body (the olive) and plastically deform it, obtaining the crimping of the hydraulic sealing body on the head of the coupling terminal.

The clamping action must be calibrated, preferably using a torque wrench, so as to deform the olive by a predetermined amount that ensures both the mechanical seal of the coupling terminal inside the seat of the actuator or of the connector, and the hydraulic seal of the olive in the seat of the actuator or of the connector.

The Applicant has noted that the connection operations of a hydraulic hose to an actuator or to a connector summarily described above have some difficulties.

In particular, the Applicant has found that in some cases when the olive is inserted in the seat of the actuator or of the connector, the olive takes up a slightly inclined position, in other words the axis of the inner cavity is arranged with an inclination that makes it difficult and even impossible to insert the head of the coupling terminal inside the cavity.

Moreover, the Applicant has noted that during the clamping of the clamping screw the head of the coupling terminal can slide axially inside the cavity of the olive and take up a position, with respect to the olive and inside the seat of the actuator or of the connector, not suitable for allowing the olive to perform its hydraulic sealing function.

Furthermore, the Applicant has noted that during the clamping of the clamping screw, the hose tends to rotate (driven by the clamping screw) with respect to the seat of the actuator or of the connector, transferring forces to the olive that can change the position thereof.

This forces the person in charge of assembly to hold the actuator (or the connector) and the hydraulic hose to avoid mutual displacements and, at the same time, to clamp the clamping screw. Such an operation is very difficult, especially when the person doing it has greasy hands from brake liquid or oil.

Document EP 3042836 A1 describes a hydraulic hose assembly in which the head of the coupling terminal has an annular groove engaged by an elastic slider.

When the head of the coupling terminal is inserted in the olive, the elastic slider emerges from the annular groove of the head of the coupling terminal and prevents the needle (and therefore the hydraulic hose) from translating axially in the opposite direction to that of insertion.

The quoted document EP 3042836 A1 describes a further hydraulic hose assembly in which the head of the coupling terminal is threaded and is screwed into a corresponding threading obtained in the cavity of the olive. The head of the coupling terminal further comprises a shoulder that abuts against the olive to acts as an end stop for the screwing of the head of the coupling terminal in the olive.

The Applicant has noted that the hydraulic sealing body and the hydraulic hose assemblies described in document EP 3042836 A1, although improvements with respect to what is described above, do not overcome all of the quoted drawbacks.

The Applicant has indeed for example found that the elastic slider does not prevent an axial translation of the hydraulic hose towards the bottom of the seat of the actuator or of the connector, not ensuring that a predetermined position of the coupling terminal with respect to the hydraulic sealing body is maintained during the crimping step, especially in the case in which the hydraulic hose rotates with respect to the seat of the actuator or of the connector.

The Applicant has further noted that when the head of the coupling terminal is threaded, a possible anomalous clamping of the head of the coupling terminal in the threaded portion of the hydraulic sealing body could cause a deformation of the latter even before the crimping step. Furthermore, during crimping, the rotation of the hydraulic hose during the clamping of the clamping screw could cause the unscrewing of the head of the coupling terminal from the threaded seat of the hydraulic sealing body or, conversely, could increase the clamping torque of the head of the coupling terminal in the threaded seat of the hydraulic sealing body causing an undesired deformation thereof.

SUMMARY

The Applicant has perceived that it would be advantageous to be able to have a hydraulic sealing body and a hydraulic hose assembly for bicycle hydraulic braking systems in which the coupling terminal remains in a predetermined position with respect to the hydraulic sealing body during the crimping of the latter and in which possible rotations of the hydraulic hose during crimping do not cause relative displacements between the hydraulic sealing body and the coupling terminal.

The present invention relates, in a first aspect, to a hydraulic sealing body for bicycle hydraulic braking systems comprising a radially inner surface defining a through-cavity and an annular element projecting in a radially inner direction from said radially inner surface, said annular element comprising a first annular abutment surface configured to receive in contact relationship a head portion of a coupling terminal and a second annular abutment surface, axially opposite to the first, configured to receive in contact relationship an axial end of a hydraulic hose.

The present invention relates, in a second aspect, to a hydraulic hose comprising an axial end; a coupling terminal comprising an insertion portion inserted in said axial end of the hydraulic hose and a head portion arranged at an end of the insertion portion and projecting in a radially outer direction from said insertion portion; and, a hydraulic sealing body comprising a radially inner surface defining a through-cavity and an annular element projecting in a radially inner direction from said radially inner surface, said annular element of the hydraulic sealing body comprising a first annular abutment surface in contact relationship with said head portion of the coupling terminal and a second annular abutment surface, axially opposite to the first, in contact relationship with said axial end of the hydraulic hose.

BRIEF DESCRIPTION OF THE DRAWINGS

The features and advantages of the present invention will become clearer from the following detailed description of some preferred embodiments thereof, made with reference to the attached drawings, given for indicating and not limiting purposes. In such drawings:

FIG. 3 shows a hydraulic sealing body in accordance with the present invention;

FIGS. 3A and 3B show the hydraulic sealing body of FIG. 3 in two variant embodiments;

FIG. 4 shows a further variant embodiment of the hydraulic sealing body of FIG. 3;

FIG. 6A shows a section of the hydraulic hose assembly of FIG. 1 mounted on a further hydraulic brake pump;

DETAILED DESCRIPTION OF THE PREFERRED EMBODIMENTS

Figure 1:
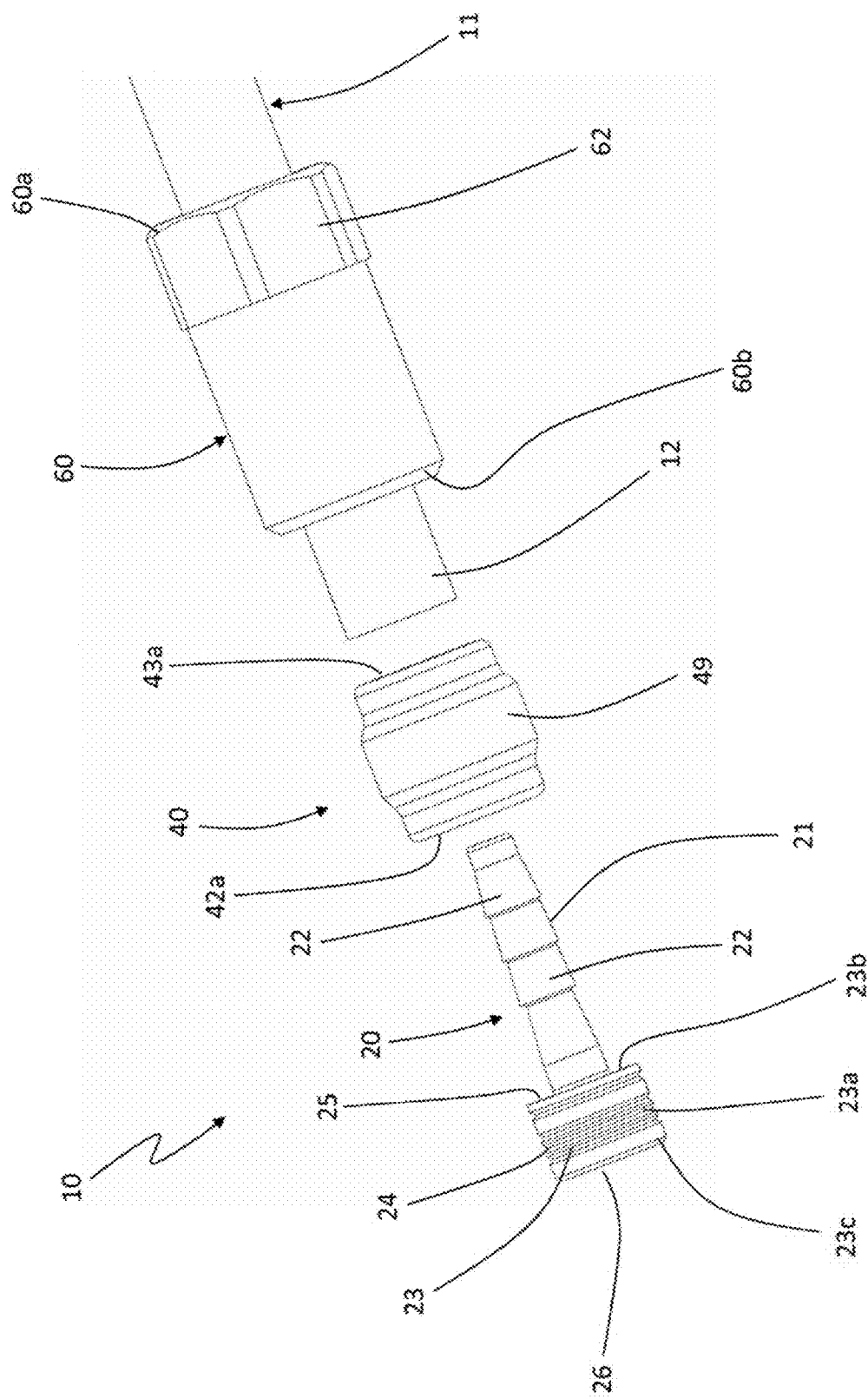
FIG. 1 is an exploded view of a hydraulic hose assembly for bicycle hydraulic braking systems in accordance with the present invention.

In the rest of the present description and in the following claims, the terms "radial" and "axial" are used with reference to directions respectively perpendicular and parallel to (or coinciding with) a longitudinal axis of the hydraulic hose.

The expressions "radially inner" and "radially outer" respectively indicate a positioning closer to and further from the aforementioned longitudinal axis.

The coupling terminal, or needle, makes it possible to interface the hydraulic hose with the actuator or a connector so as to ensure the necessary hydraulic continuity of the braking system.

The hydraulic sealing body, or olive, makes it possible to ensure the fluid seal of the braking system at the coupling terminal, as well as to ensure a good mechanical seal in the coupling between the coupling terminal and the actuator or the connector.

The annular element arranged inside the through-cavity of the hydraulic sealing body acts as a reference for the axial positioning of the coupling terminal with respect to the hydraulic sealing body, with respect to the hydraulic hose and with respect to the actuator or to the connector.

The Applicant has indeed perceived that by equipping the annular element with two mutually opposite annular abutment surfaces in the axial direction it is possible to abut the head portion of the coupling terminal against one of such annular abutment surfaces and to abut the free end of the hydraulic hose against the other annular abutment surface.

In this way, the annular element is confined between the head portion of the coupling terminal and the hydraulic hose, with the coupling terminal firmly coupled to the hydraulic hose by means of the insertion of the insertion portion in the hydraulic hose.

The hydraulic sealing body is thus held in a predetermined position with respect to the coupling terminal even before crimping.

The Applicant has perceived that in this way the connection operations of the hydraulic hose to the actuator or to the connector are also greatly simplified.

In particular, the Applicant has found that such operations require that the head portion of the coupling terminal be inserted in the inner cavity of the hydraulic sealing body and that the hydraulic hose be inserted in the cavity of the sealing body on the axially opposite side with respect to the head of the coupling terminal.

By inserting the insertion portion of the coupling terminal in the hydraulic hose (preferably using a known pressing tool for such an operation) the head portion of the coupling terminal is brought in contact relationship against the first annular abutment surface of the annular element and the end of the hydraulic hose is brought in contact relationship against the second annular abutment surface of the annular element, locking together the coupling terminal, the hydraulic sealing body and the hydraulic hose.

The subsequent crimping of the hydraulic sealing body inside the seat of the actuator or of the connector can thus be carried out without having to verify and check, moment by moment, the mutual axial positioning between coupling terminal, hydraulic sealing body and hydraulic hose and without the need to check the rotation of the hydraulic hose with respect to the hydraulic sealing body and with respect to the coupling terminal, allowing simple, precise and easy crimping capable of ensuring an excellent fluid seal and mechanical seal.

In this way, furthermore, it is not necessary to hold the hydraulic hose, the actuator or the connector and, simultaneously, actuate the clamping screw, but it is simply necessary to hold the hydraulic hose inside the seat of the actuator or of the connector and actuate the clamping screw.

The present invention can comprise, in one or more of its aspects, one or more of the following preferred features, singularly or in combination.

Preferably, said head portion of the coupling terminal comprises, at an axial end facing towards said insertion portion, an annular abutment surface placed in contact relationship with said first abutment surface of the annular element of the hydraulic sealing body.

In this way, the positioning of the coupling terminal in the hydraulic sealing body is complete when the annular abutment surface contacts the first abutment surface of the hydraulic sealing body.

The annular abutment surface makes the correct insertion of the connection terminal inside the hydraulic sealing body immediately perceptible.

Preferably, said radially inner surface of the hydraulic sealing body defines a first opening for the insertion of said head portion of the coupling terminal and a second opening for the insertion of said axial end of the hydraulic hose.

The coupling terminal and the hydraulic hose are inserted in the hydraulic sealing body from axially opposite openings thereof, so that the coupling terminal can contact the first abutment wall and the hydraulic hose the second abutment wall of the annular element.

Preferably, said annular element of the sealing body defines a central opening having a diameter smaller than the dimension in the radial direction of the head portion of the coupling terminal and greater than the dimension in the radial direction of the insertion portion of the coupling terminal.

In this way, when the coupling terminal is inserted into the hydraulic sealing body, the insertion portion of the coupling terminal crosses the annular element and can be inserted in the hydraulic hose.

Preferably, said hydraulic sealing body comprises a perimeter wall defined between said radially inner surface and a radially outer surface; said perimeter wall having a thickness at the annular element greater than the thickness at the first and second opening.

In this way, the portion of the hydraulic sealing body equipped with the annular element is not deformed, or is only deformed to a minimal extent during crimping, allowing the annular element to remain in position and perform its function even during crimping.

Preferably, said annular element is arranged in an intermediate axial position between the first and the second opening.

This allows both of the end portions of the hydraulic sealing body to deform and make a fluid seal following crimping.

Preferably, said annular element is made in one piece with the hydraulic sealing body.

In this case, the annular element is made by turning directly on the hydraulic sealing body.

Alternatively, said annular element is an insert inserted in said through-cavity of the hydraulic sealing body.

In this case it is possible to select the most suitable material from which to make the annular element in view of the function that it must perform.

The Applicant has found that it is preferable for said annular element to be made of elastomeric material, preferably rubber.

In this way, the annular element has a certain degree of flexibility that allows it to better adapt and receive in contact relationship the end of the hydraulic hose and the head portion of the coupling terminal.

Furthermore, making the hydraulic sealing body is easier since the annular element can be inserted in position after the hydraulic sealing body has been made in a substantially cylindrical shape.

Concerning this, preferably said hydraulic sealing body comprises, on said radially inner surface, an annular groove engaged by an annular projection of said annular element.

The groove can be obtained easily by turning of the inner surface of the hydraulic sealing body and can act as a seat to hold the annular element in position.

Preferably, said head portion of the coupling terminal comprises a connection surface arranged at an axial end of the head portion opposite to the insertion portion; said connection surface being axially outer with respect to the hydraulic sealing body.

The position of the connection surface of the coupling terminal with respect to the hydraulic sealing body determines the effectiveness of the fluid seal of the coupling of the assembly with an actuator or a connector.

The Applicant has indeed found that it is suitable for the coupling surface of the coupling terminal to emerge axially from the hydraulic sealing body to ensure that it is the latter, after crimping, that makes the fluid seal of the connection.

The size of the axial extension of the coupling surface of the coupling terminal with respect to the hydraulic sealing body can depend on the particular actuator or connector on which the assembly is assembled and/or on the specific coupling terminal that is used.

Preferably, said head portion of the connection terminal comprises, on a radially outer surface, a plurality of annular throats.

The annular throats have the function of allowing the hydraulic sealing body to be mechanically coupled to the head of the coupling terminal following crimping.

Preferably, a clamping screw is slidably couplable with said hydraulic hose and configured to contact and crimp said hydraulic sealing body.

The hydraulic hose assembly for bicycle hydraulic braking systems can be provided in a kit.

Concerning this, according to a third aspect, the present invention relates to a kit for connecting a bicycle hydraulic hose to an actuator or to a hydraulic connector comprising a coupling terminal having one or more of the aforementioned features or those that will be described hereinafter, a hydraulic sealing body having one or more of the aforementioned features or those that will be described hereinafter and provided with an annular element having one or more of the aforementioned features or those that will be described hereinafter, and a clamping screw having one or more of the aforementioned features or those that will be described hereinafter.

The kit can furthermore also comprise a hydraulic hose.

According to a fourth aspect, the present invention relates to a method for assembling a hydraulic hose assembly comprising:

providing a hydraulic sealing body having a through-cavity in which an annular element is arranged projecting in a radially inner direction comprising a first annular abutment surface, a second annular abutment surface axially opposite to the first and a central hole;

providing a coupling terminal having a head portion and an insertion portion;

providing a hydraulic hose having an axial end;

inserting the coupling terminal in the through-cavity of the hydraulic sealing body so that the insertion portion crosses the central hole;

inserting the insertion portion of the coupling terminal in the axial end of the hydraulic hose so that the head portion of the coupling terminal contacts the first annular abutment surface of the hydraulic sealing body and the axial end of the hydraulic hose contacts the second annular abutment surface of the hydraulic sealing body.

Referring now to the attached figures, reference numeral 10 indicates a hydraulic hose assembly for bicycle hydraulic braking systems in accordance with the present invention. Such an assembly 10 is preferably intended to be used in a racing bicycle hydraulic braking system.

As shown in FIG. 1, the assembly 10 comprises a hydraulic hose 11, a coupling terminal 20, a hydraulic sealing body 40 and a clamping screw 60.

The coupling terminal 20, the hydraulic sealing body 40, the clamping screw 60 and possibly also the hydraulic hose can be provided in kit form, in other words decoupled so as to then be able to be coupled together in the way that will be described hereinafter.

The coupling terminal 20 is preferably made of steel or aluminum.

The coupling terminal 20 is internally hollow so as to define a passage channel 20a (FIG. 2) that axially crosses the entire coupling terminal 20.

Figure 5:
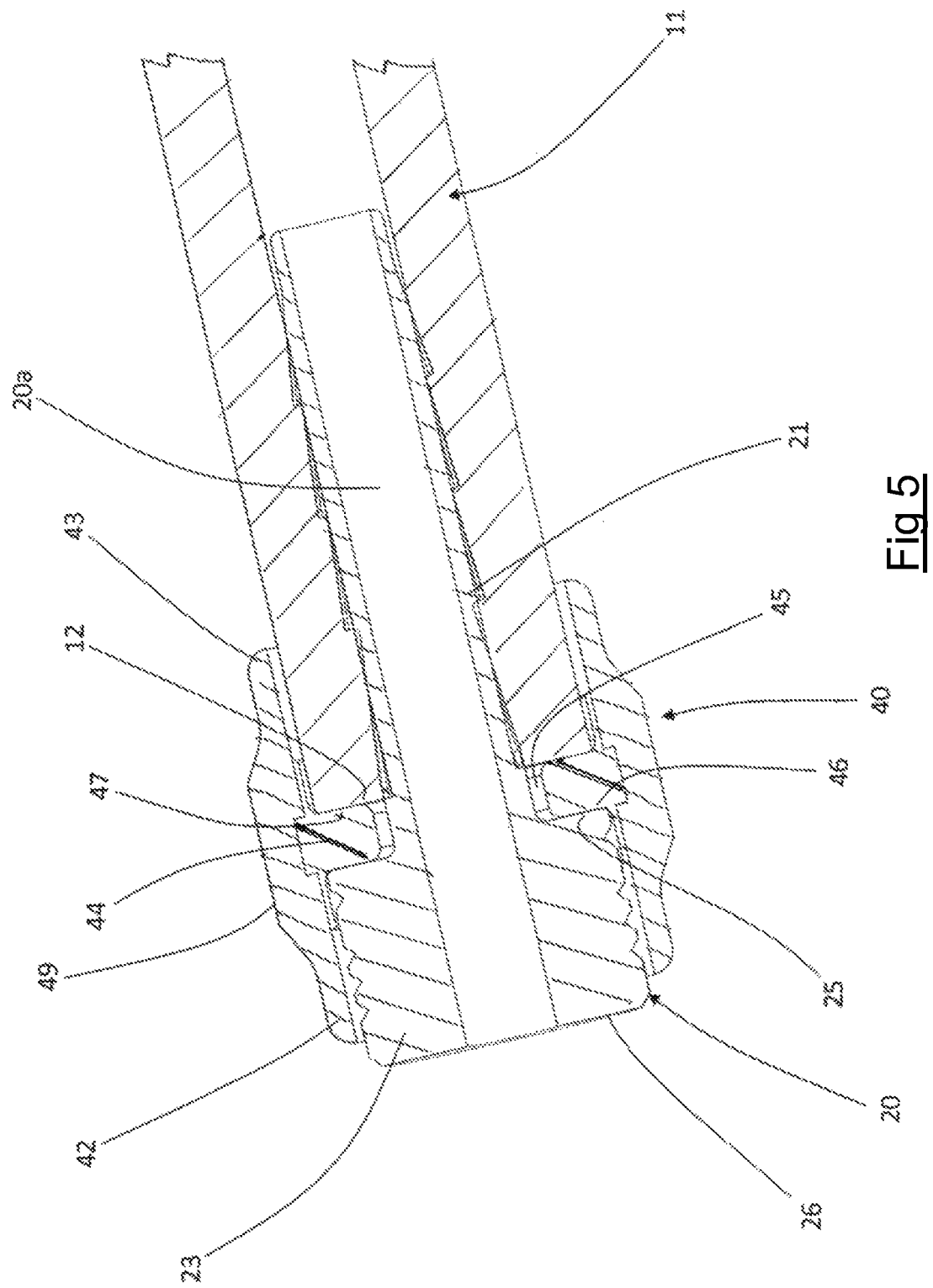
FIG. 5 shows the hydraulic hose assembly of FIG. 1 in assembled configuration and in section.

The coupling terminal 20 comprises an insertion portion 21 having a substantially tubular shape which can be inserted in an end 12 of the hydraulic hose 11 so as to be able to mechanically and hydraulically connect the latter to the coupling terminal 20, as illustrated in FIG. 5.

The stable coupling of the insertion portion 21 in the hydraulic hose 11 is obtained by making a plurality of conical portions 22 intended to mechanically interfere with the radially inner surface of the hydraulic hose 11 on the radially outer surface 21a of the insertion portion 21.

The profile of the plurality of conical portions 22 is such as to allow the insertion of the insertion portion 21 in the hydraulic hose 11 but counteracting subsequent coming out thereof.

The coupling terminal 20 comprises, at an axial end 20b, a head portion 23 which has a size in the radial direction that is greater than the size in the same direction of the insertion portion 21.

The head portion 23 and the insertion portion 22 are made in one piece.

Figure 2:
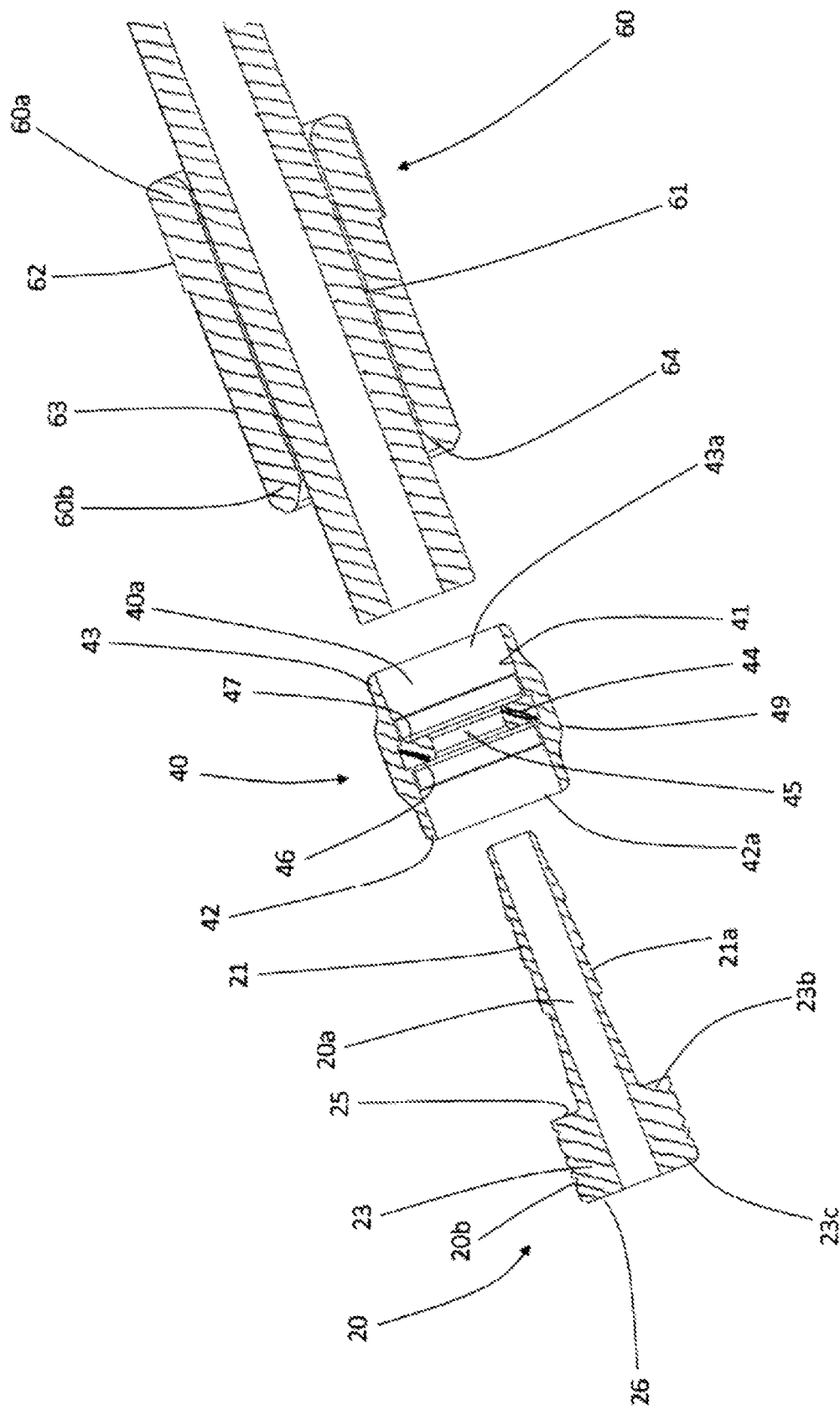
FIG. 2 is a section view of the hydraulic hose assembly of FIG. 1.

The head portion 23 has a substantially cylindrical shape and is crossed by the passage channel 20a, see FIG. 2.

The radially outer surface 23a of the head portion 23 is provided with a plurality of annular throats 24 the function of which will be explained hereinafter.

At an axial end 23b of the head portion 23 facing the insertion portion 21, the head portion 23 comprises an annular abutment surface 25 substantially perpendicular to the axis of the passage channel 20a.

At the other axial end 23c of the head portion 23, opposite to the axial end 23b, the head portion 23 comprises a connection surface 26 intended for the hydraulic connection with an actuator 100, 200, 400 or with a connector 300.

Figure 6:
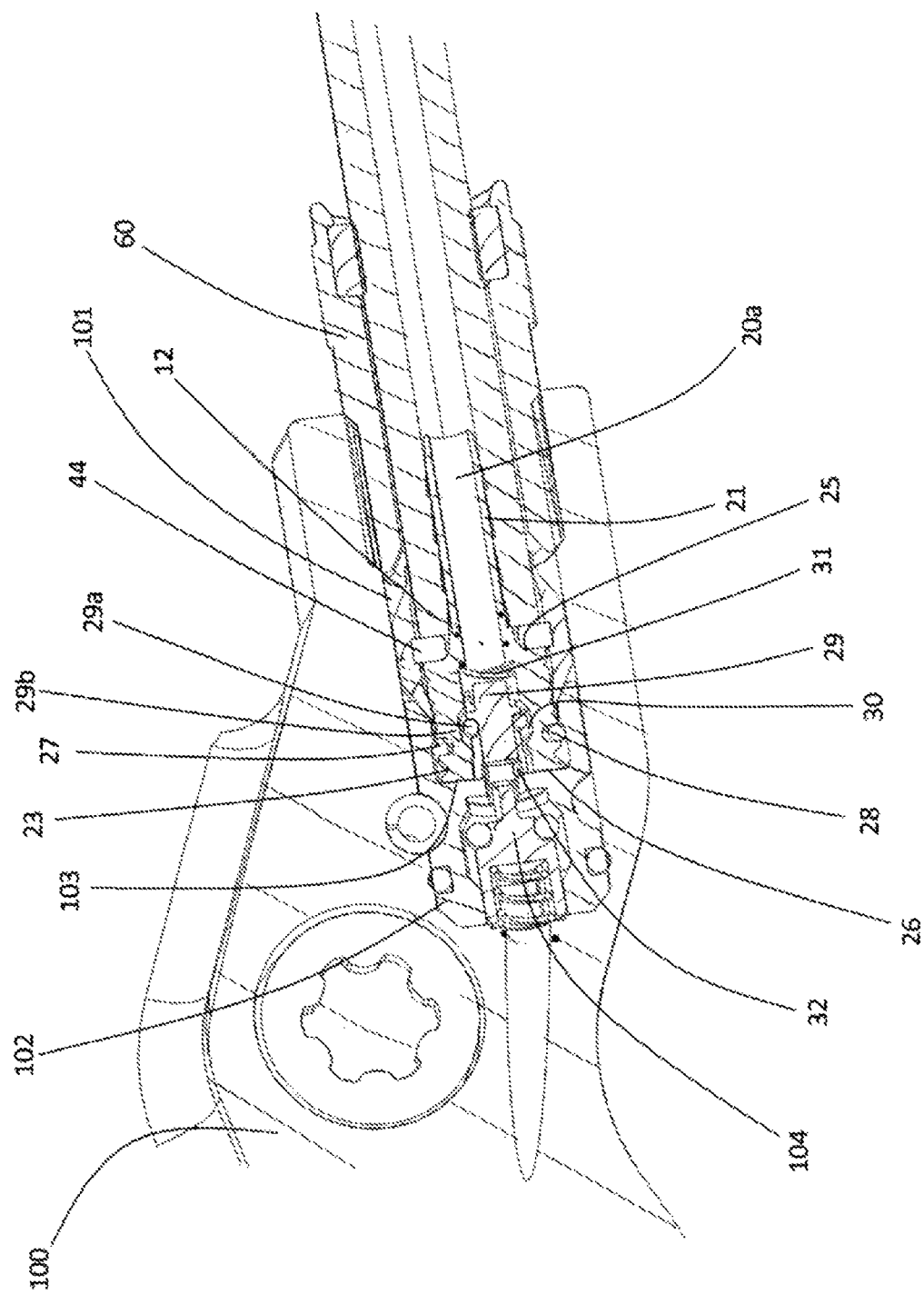
FIG. 6 shows a section of the hydraulic hose assembly of FIG. 1 mounted on a hydraulic brake pump.
Figure 7:
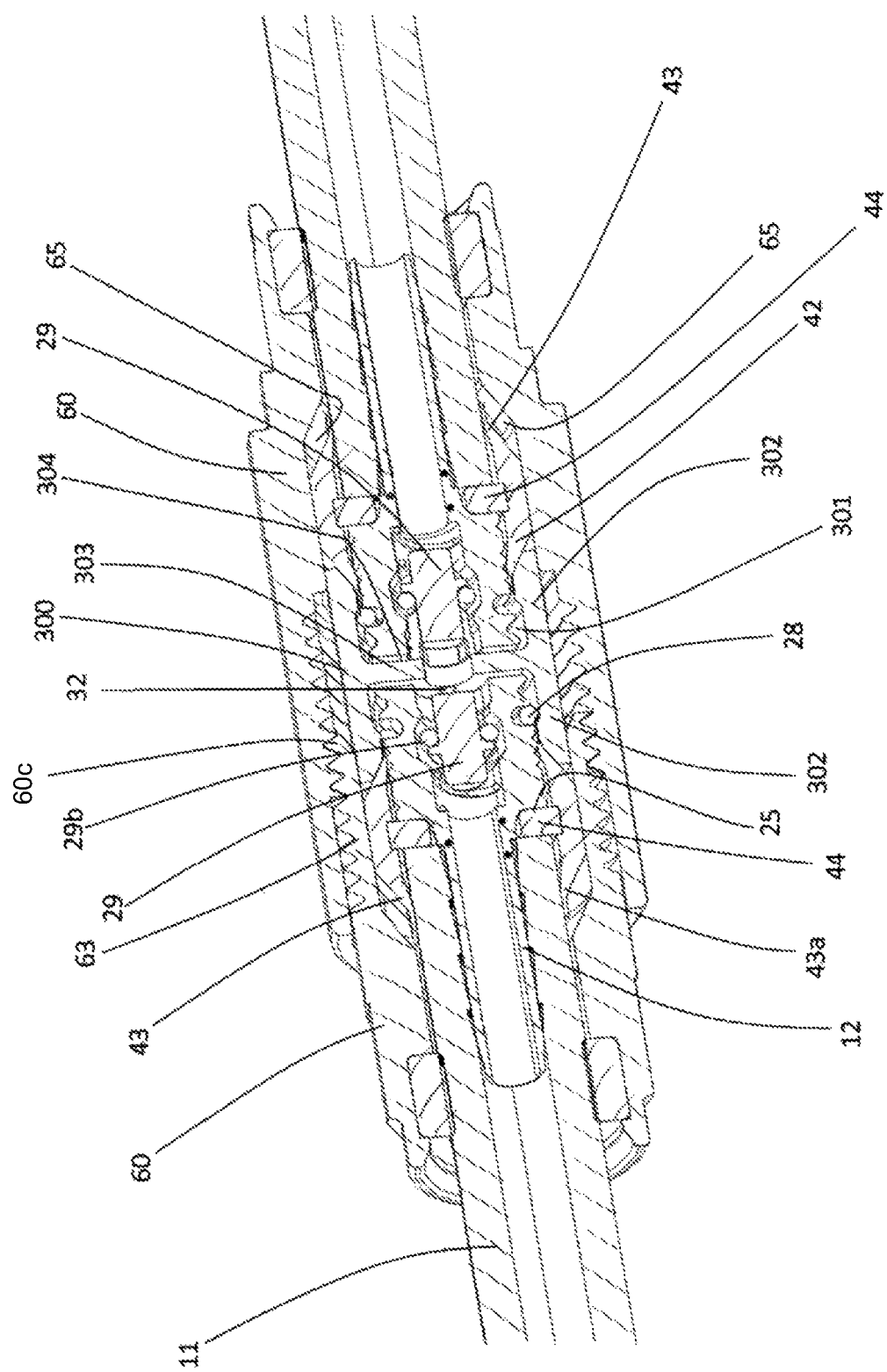
FIG. 7 shows a section of two hydraulic hose assemblies of FIG. 1 connected together by a connector.
Figure 8:
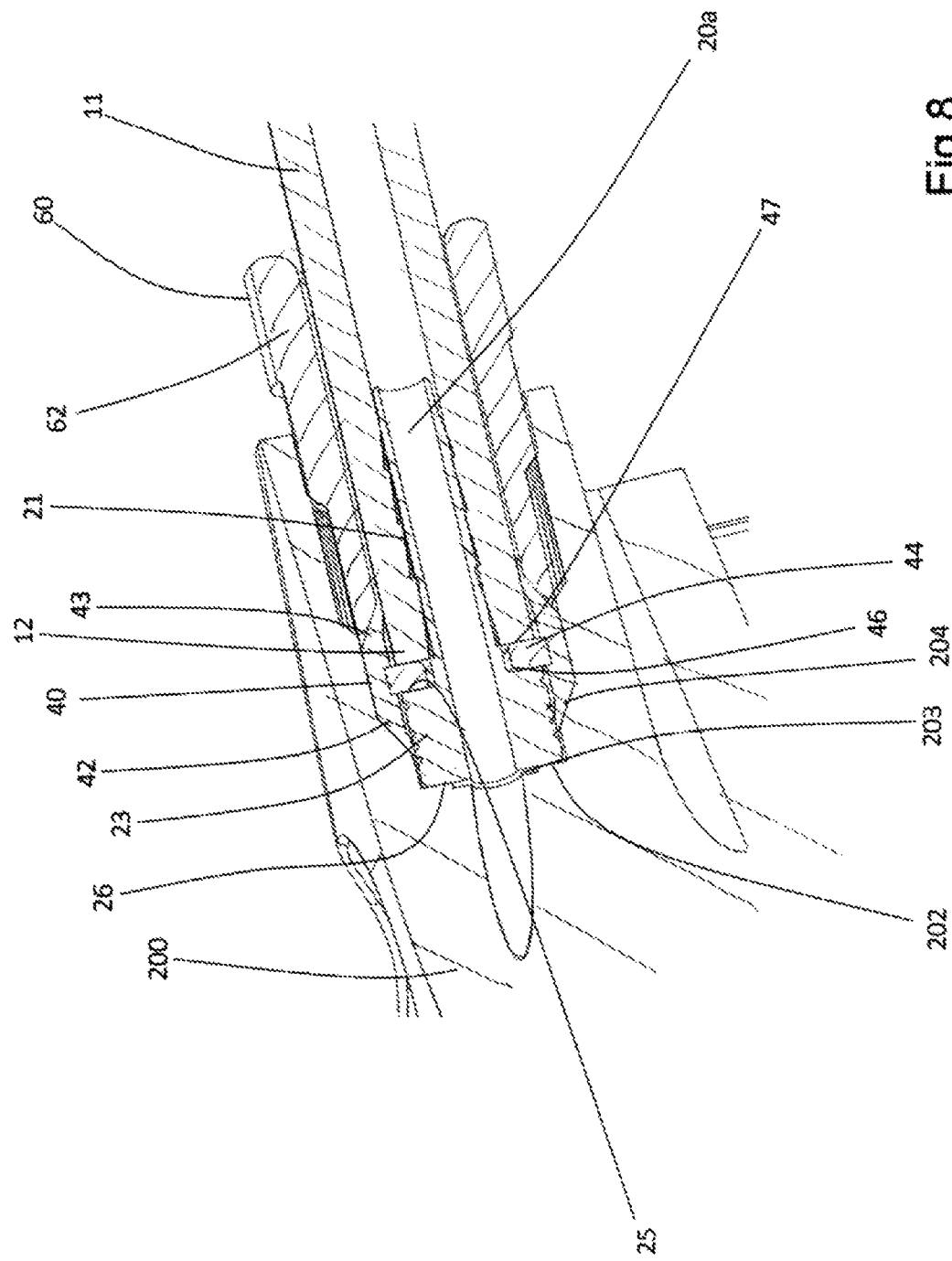
FIG. 8 shows a section of the hydraulic hose assembly of FIG. 1 mounted on a hydraulic brake caliper.

Concerning this, the actuator 100 or the connector 300 that receives the coupling terminal 20 can be provided with a coupling body 102, 302 configured to be inserted in a recess 101, 301 of the actuator 100 or of the connector 300, as shown in FIGS. 6 and 7 or it can be of the type that directly receives the coupling terminal 20 without the use of any coupling body, as shown in the example of FIGS. 6A and 8.

In the case in which the coupling terminal 20 is received in a coupling body 102, 302, the head portion 23 of the coupling terminal 20 can comprise an annular recess 27 arranged close to the axial end 23c of the head portion 23 opposite to the axial end 23b facing the insertion portion 21, as for example illustrated in FIGS. 6 and 7.

A locking ring 28, shown in FIGS. 6 and 7 and preferably made of metallic material, is housed inside the annular recess 27.

Such a locking ring 28 is radially deformable between a maximum inner diameter and a minimum inner diameter, wherein the minimum inner diameter is substantially equal to the radially inner circumference of the annular recess 27. When the locking ring 28 has the minimum inner diameter, the radial space occupied by it is completely contained in the radial space occupied by the head portion 23. The deformation of the diameter of the locking ring 28 is ensured by the fact that the locking ring 28 is an open ring having two mutually facing and spaced ends. When such two ends are close together, the diameter of the locking ring 28 has the minimum inner diameter, whereas when the two ends are spaced apart the diameter of the locking ring 28 has the maximum inner diameter. The passage of the locking ring 28 from the maximum inner diameter to the minimum inner diameter takes place by applying a force directed radially towards the center of the locking ring 28.

The connection terminal 20 can further comprise a sealing slider 29, arranged inside the head portion 23 in the passage channel 20a, sliding axially with respect to the head portion 23.

The sealing slider 29, see FIGS. 6 and 7, can be switched into a first position in which it prevents the passage of oil inside the passage channel 20a therefore isolating the end of the hydraulic hose 11 to which the coupling terminal 20 is connected from the outside.

The fluid seal between the sealing slider 29 and the coupling terminal 20 is preferably carried out by an annular gasket 29a arranged in an annular housing 29b obtained in radially outer position with respect to the sealing slider 29 and by a radially inner annular recess 30 with respect to the head portion 23.

In order to ensure the stability of the first position of the sealing slider 29 and prevent it being able to be accidentally displaced from such a position, a spring 31 is active on the sealing slider 29 and exerts a force directed axially internally on it. The sealing slider 29 can be switched into a second position in which it allows the passage of oil in the passage channel 20a allowing the hydraulic connection of the hydraulic hose.

Concerning this, the first sealing slider 29 comprises a projection 32 that extends axially away from the slider 29. When the coupling terminal 20 is inserted in a seat of an actuator 100 or in a connector 300 the projection 32 moves back switching the slider 29 into the second position.

As shown in FIGS. 2 through 4, the hydraulic sealing body 40 comprises a radially inner surface 41 which defines an inner through-cavity 40a that extends from a first end 42 to a second end 43 of the hydraulic sealing body 40.

The inner through-cavity 40a is open at the first end 42 so as to define an access opening 42a inside the through-cavity 40a.

Such an opening 42a has greater radial dimensions than the radial dimensions of the head portion 23 of the coupling terminal 20.

In the preferred embodiment of the invention, the through-cavity 40a of the hydraulic sealing body and the head portion 23 of the coupling terminal 20 have a substantially cylindrical shape.

The opening 42a thus has a circular shape with a greater diameter than the diameter of the head portion 23 of the coupling terminal 20.

The inner through-cavity 40a is also open at the second end 43 so as to define an access opening 43a inside the through-cavity 40a.

Such an opening 43a has greater radial dimensions than the radial dimensions of the hydraulic hose 11.

An annular element 44 extends from the radially inner surface 41 of the hydraulic sealing body 40, said annular element 44 projecting radially towards the inside of the through-cavity 40a.

As illustrated in FIGS. 2, 3, 4 and 5, the annular element 44 comprises a first annular abutment surface 46 and a second annular abutment surface 47 which are opposite one another.

The first 46 and second annular abutment surface 47 are substantially perpendicular to the axial direction and lie on respective planes preferably parallel to one another.

The first annular abutment surface 46 is configured to receive in contact relationship the annular abutment surface 25 of the head portion 23 of the coupling terminal 20.

For this purpose, the annular element 44 is joined to the radially inner surface 41 and has a central hole 45 to allow the insertion portion 21 of the coupling terminal 20 to go past the annular element 44 and take the annular abutment surface 25 in abutment against the first annular abutment surface 46.

The dimensions of the central hole 45 are greater than the radial dimensions of the insertion portion 21 of the coupling terminal 20.

The second annular abutment surface 47 is configured to receive in contact relationship the end 12 of the hydraulic hose 11.

As illustrated better in FIGS. 3 and 4, the annular element 44 is arranged in a portion of the hydraulic sealing body 40 substantially equidistant from the openings 42a, 43a.

The perimeter wall 48 of the hydraulic sealing body 40, defined between the radially inner surface 41 and a radially outer surface 49, has a greater thickness at the position of the annular element 44 with respect to the thickness at the openings 42a, 43a.

The perimeter wall 48 is made of ductile metallic material, for example brass.

In the embodiment illustrated in FIG. 4, the annular element 44 is in one piece with the perimeter wall 48 of the hydraulic sealing body 40.

In this embodiment, the annular element is made by mechanical processing, for example by turning.

In the embodiments illustrated in FIGS. 3, 3A and 3B, the annular element 44 is an insert coupled to the radially inner surface 41 of the hydraulic sealing body 40.

In these embodiments, the radially inner surface 41 comprises an annular groove 50 engaged by an annular projection 51 of the annular element 44.

The annular element 44 can comprise two annular appendages 52 (as illustrated in FIG. 3) that extend axially away from the annular projection 51 and that are in contact with the radially inner surface 41 of the hydraulic sealing body 40.

In the embodiments of FIGS. 3A and 3B, the two annular appendages 52 are not present.

The annular element 44 is made of elastomeric material, preferably vulcanized rubber.

The first 46 and second abutment surface 47 can define flat and mutually parallel surfaces, like in the embodiments of FIGS. 3 and 4, or can define mutually inclined flat walls, as illustrated in FIGS. 3A and 3B. In this case, the first 46 and second abutment surface 47 can be convergent towards the central hole 45 (as illustrated in FIG. 3B) or divergent towards the central hole 45 (as illustrated in FIG. 3A).

The clamping screw 60 comprises an inner through-cavity 61 to be able to be slidably fitted on the hydraulic hose 11.

The clamping screw 60 comprises a head 62 arranged at a first end 60a and having a prismatic profile. The head 62 is engageable by a maneuvering key to be able to rotate the clamping screw 60 about an axis directed in the axial direction.

A radially outer surface 63 arranged between the head 62 and a second end 60b of the clamping screw 60 is provided with a threading matching a threading made in a seat of an actuator 100, 200, 400.

As illustrated in FIG. 2, the second end 60b of the clamping screw 60 is flared so as to define a conical engagement surface 64 on the edge of the opening 43a of the hydraulic sealing body 40.

In an embodiment of the invention, and in particular in the case in which two assemblies 10 are connected together by means of a connector 300 (as illustrated in FIG. 7), the clamping screws 60 of the two assemblies are configured to couple together.

In particular, one of the two clamping screws 60 comprises a threading arranged on the radially outer surface 63, whereas the other clamping screw 60 has a threading arranged on a radially inner surface 60c.

The threadings of the two clamping screws 60 match one another so as to be able to screw one clamping screw 60 on the other clamping screw 60, as will be described better hereinafter.

In this embodiment, both of the clamping screws 60 comprise a shoulder 65 obtained on the radially inner surface each of which is engageable on the edge of the opening 43a of the corresponding hydraulic sealing body 40 (FIG. 7).

In this embodiment, the clamping screw 60 is not provided, at the second end 60b with the quoted flaring adapted for engaging the edge of the opening 43a of the hydraulic sealing body 40.

Advantageously, the coupling terminal 20, the hydraulic sealing body 40 and the hydraulic hose 11 can be coupled together before inserting the assembly 10 in a seat of an actuator 100, 200, 400 or of a connector 300.

Concerning this, the coupling terminal 20 is inserted in the opening 42a of the hydraulic sealing body 40 so that the insertion portion 21 crosses the central hole 45 of the annular element 44.

The end 12 of the hydraulic hose 11 is inserted in the other opening 43a of the hydraulic sealing body 40.

Using a conventional pressing tool, the insertion portion 21 of the coupling terminal 20 is introduced into the hydraulic hose 11.

During this operation, the annular abutment surface 25 of the head portion 23 of the coupling terminal 20 is taken into abutment against the first annular abutment surface 46 of the annular element 44.

At the same time, the end 12 of the hydraulic hose 11 is taken into abutment against the second annular abutment surface 47 of the annular element 44.

The clamping screw 60 is fitted in advance on the hydraulic hose 11.

The configuration thus reached is such that the hydraulic sealing body 40 is locked between the head portion 23 of the coupling terminal 20 and the hydraulic hose 11, impeded with respect to any axial movement by the annular element 44.

FIG. 6 shows the coupling of the assembly 10 with a hydraulic brake caliper 100 provided with coupling body 102 inserted in a cylindrical recess 101 of the brake caliper 100.

The coupling body 102 comprises an annular wall 103 facing towards the connection surface 26 of the axial end 23c of the coupling terminal 20. The annular wall 103 and the connection surface 26 are flat surfaces intended to be in mutual contact when the coupling terminal 20 is in operative configuration (as shown in FIG. 6).

The coupling body 102 comprises a sealing slider 104 sliding in the axial direction and emerging from the center of the annular wall 103. The sealing slider 104 can be moved between a first position in which it impedes the passage of oil in the brake caliper and a second position in which it allows the passage of oil from and towards the brake caliper 100. When the coupling terminal 20 is not inserted or is not completely inserted in the coupling body 102, the sealing slider 104 projects axially beyond the annular wall 103 abutting in the first position.

When the coupling terminal 20 is inserted in the coupling body 102 and the respective connection surface 26 abuts on the annular wall 103, the projection 32 of the slider 29 of the coupling terminal 20 contacts the sealing slider 104 causing it to move back and switching it into the second position. At the same time, the slider 29 of the coupling terminal 20 also moves back switching into the second position.

In order to lock the assembly 10 in position in the coupling body 102, the clamping screw 60 is screwed onto a threading inside the recess 101 of the brake caliper 100 matching the threading of the clamping screw 60.

During this operation it is only necessary to hold the coupling terminal 20 in abutment against the bottom of the coupling body 102, since (as stated above) the hydraulic sealing body 40 and the hydraulic hose 11 are impeded from moving axially with respect to the coupling terminal 20.

The screwing of the clamping screw 60 takes the second end 60b of the clamping screw in contact with the edge of the opening 43a of the second end 43 of the hydraulic sealing body 40.

In this situation, the hydraulic sealing body 40 is radially arranged between the wall of the recess 101 of the brake caliper 100 and the coupling terminal 20.

Furthermore, the hydraulic sealing body 40 is axially arranged between the clamping screw 60 and the coupling body 102, as illustrated in FIG. 6.

Due to the axial thrusting action exerted on the hydraulic sealing body 40 by the clamping screw 60, the ends 42, 43 of the hydraulic sealing body 40 undergo a deformation by crimping. After this deformation, the end portion 42 of the hydraulic sealing body 40 is partially embedded in at least part of the throats 24 formed on the outer surface 23a of the head of the coupling terminal 20.

The crimping of the hydraulic sealing body 40 therefore ensures both a mechanical seal and a hydraulic seal between the brake caliper 100 and the hydraulic hose 11.

Indeed, it should be noted that during crimping the hydraulic sealing body 40 is in a predetermined axial position inside the recess 101 of the brake caliper 100 and with respect to the coupling terminal 20, without any possibility of axial movements, therefore ensuring that the hydraulic sealing body 40 is crimped in a position suitable for ensuring a perfect hydraulic seal of the joint.

FIG. 6A shows the coupling of the assembly 10 with a hydraulic brake caliper 400 provided with a cylindrical recess 401.

The recess 401 comprises an annular bottom wall 402 in fluid communication with the part of hydraulic circuit of the brake caliper 400.

The annular bottom wall 402 faces towards the annular connection surface 26 of the axial end 23c of the coupling terminal 20. The annular bottom wall 402 and the connection surface 26 may not be in mutual contact when the coupling terminal 20 is in operative configuration but at axially spaced apart by a small distance (as shown in FIG. 6A).

In the illustrated example, the head portion 23 of the coupling terminal 20 is not provided with the slider 29.

The distance that separates the annular bottom wall 402 and the connection surface 26 has the function of making a chamber 403 intended to fill with oil when the coupling terminal is in operative configuration.

In order to lock the assembly 10 in position in the recess 401, the clamping screw 60 is screwed onto a threading inside the recess 401 of the brake caliper 400 matching the threading of the clamping screw 60.

During this operation it is only necessary to hold the coupling terminal 20 at the predetermined distance from the annular bottom wall 402 of the recess 401, since the hydraulic sealing body 40 and the hydraulic hose 11 are impeded from moving axially with respect to the coupling terminal 20.

The screwing of the clamping screw 60 takes the second end 60b of the clamping screw in contact with the edge of the opening 43a of the second end 43 of the hydraulic sealing body 40.

In this situation the hydraulic sealing body 40 is radially arranged between the wall of the recess 401 of the brake caliper 400 and the coupling terminal 20.

Furthermore, the hydraulic sealing body 40 is axially arranged between the clamping screw 60 and a shoulder 404 of the recess 401, as illustrated in FIG. 6A.

Due to the axial thrusting action exerted on the hydraulic sealing body 40 by the clamping screw 60, the ends 42, 43 of the hydraulic sealing body 40 undergo a deformation by crimping. After this deformation, the end portion 42 of the hydraulic sealing body 40 is partially embedded in at least part of the throats 24 formed on the outer surface 23a of the head of the coupling terminal 20.

The crimping of the hydraulic sealing body 40 therefore ensures both a mechanical seal and a hydraulic seal between the brake caliper 400 and the hydraulic hose 11.

Indeed, it should be noted that during crimping the hydraulic sealing body 40 is in a predetermined axial position inside the recess 401 of the brake caliper 400 and with respect to the coupling terminal 20, without any possibility of axial movements, therefore ensuring that the hydraulic sealing body 40 is crimped in a suitable position to ensure a perfect hydraulic seal of the joint.

FIG. 7 shows the coupling of two assemblies 10 by means of a connector 300 provided with a connection body 302 having respective recesses 301 axially opposite one another.

The connection body 302 comprises an annular wall 303 that divides the two connection bodies and that defines two abutment walls 304 axially opposite one another, each of which faces towards the connection surface 26 of a respective coupling terminal 20. The annular wall 103 and the connection surface 26 are flat surfaces intended to be in mutual contact when the coupling terminal 20 is in operative configuration (as shown in FIG. 7).

When a coupling terminal 20 is inserted in the connection body 302 and the respective connection surface 26 abuts on the abutment wall 304, the projection 32 of the slider 29 of the coupling terminal 20 contacts the abutment wall 304 moving back the slider 29 and switching it into the second position.

In order to lock the two assemblies 10 in position in the connection body 302, the two clamping screws 60 are screwed into one another, engaging the threadings of the clamping screws 60 with each other (as shown in FIG. 7).

During this operation it is only necessary to hold the coupling terminals 20 in abutment against the abutment walls 304 of the connection body 302, since (as stated above) the hydraulic sealing body 40 and the hydraulic hose 11 are impeded from moving axially with respect to the coupling terminal 20.

The screwing of the clamping screws 60 takes the shoulders 65 of the clamping screws 60 in contact with the edges of the openings 43a of the second ends 43 of the hydraulic seal bodies 40.

In this situation each hydraulic sealing body 40 is radially arranged between the clamping screw 60 and the coupling terminal 20.

Furthermore, each hydraulic sealing body 40 is axially arranged between the clamping screw 60 and the connection body 302, as illustrated in FIG. 7.

Due to the axial thrusting action exerted on each hydraulic sealing body 40 by the respective clamping screw 60, the ends 42, 43 of the hydraulic sealing body 40 undergo a deformation by crimping. After this deformation, the end portion 42 of the hydraulic sealing body 40 is partially embedded in at least part of the throats 24 formed on the outer surface 23a of the head of the coupling terminal 20.

The crimping of the hydraulic sealing body 40 therefore ensures both a mechanical seal and a hydraulic seal between the connector 300 and the hydraulic hose 11.

Indeed, it should be noted that during crimping the hydraulic sealing body 40 cannot carry out axial movements, therefore ensuring that the hydraulic sealing body 40 is crimped in a position suitable for ensuring a perfect hydraulic seal of the joint.

FIG. 8 shows the coupling of the assembly 10 with a hydraulic brake pump 200 provided with a cylindrical recess 201.

The recess 201 comprises an annular bottom wall 202 in fluid communication with the part of hydraulic circuit of the brake pump 200.

The annular bottom wall 202 faces towards the annular connection surface 26 of the axial end 23c of the coupling terminal 20. The annular bottom wall 202 and the connection surface 26 are not in mutual contact when the coupling terminal 20 is in operative configuration but are axially spaced apart by a small distance (as shown in FIG. 8).

In the illustrated example, the head portion 23 of the coupling terminal 20 is not provided with the slider 29.

The distance that separates the annular bottom wall 202 and the connection surface 26 has the function of making a chamber 203 intended to fill with oil when the coupling terminal is in operative configuration.

In order to lock the assembly 10 in position in the recess 201, the clamping screw 60 is screwed onto a threading inside the recess 201 of the brake pump 200 matching the threading of the clamping screw 60.

During this operation it is only necessary to hold the coupling terminal 20 at the predetermined distance from the annular bottom wall 202 of the recess 201, since the hydraulic sealing body 40 and the hydraulic hose 11 are prevented from moving axially with respect to the coupling terminal 20.

The screwing of the clamping screw 60 takes the second end 60b of the clamping screw in contact with the edge of the opening 43a of the second end 43 of the hydraulic sealing body 40.

In this situation the hydraulic sealing body 40 is radially arranged between the wall of the recess 201 of the brake pump 200 and the coupling terminal 20.

Furthermore, the hydraulic sealing body 40 is axially arranged between the clamping screw 60 and a shoulder 204 of the recess 201, as illustrated in FIG. 8.

Due to the axial thrusting action exerted on the hydraulic sealing body 40 by the clamping screw 60, the ends 42, 43 of the hydraulic sealing body 40 undergo a deformation by crimping. After this deformation, the end portion 42 of the hydraulic sealing body 40 is partially embedded in at least part of the throats 24 formed on the outer surface 23a of the head of the coupling terminal 20.

The crimping of the hydraulic sealing body 40 therefore ensures both a mechanical seal and a hydraulic seal between the brake pump 200 and the hydraulic hose 11.

Indeed, it should be noted that during crimping the hydraulic sealing body 40 is in a predetermined axial position inside the recess 201 of the brake pump 200 and with respect to the coupling terminal 20, without any possibility of axial movements, therefore ensuring that the hydraulic sealing body 40 is crimped in a position suitable for ensuring a perfect hydraulic seal of the joint.

Of course, those skilled in the art can bring numerous modifications and variants to the invention described above in order to satisfy specific and contingent requirements, all of which are in any case encompassed by the scope of protection of the present invention as defined by the following claims.

What is claimed is:

1. A hydraulic hose assembly for bicycle hydraulic braking systems comprising:
   a hydraulic hose comprising an axial end;
   a coupling terminal comprising an insertion portion inserted in said axial end of the hydraulic hose and a head portion arranged at an end of the insertion portion and projecting in a radially outer direction from said insertion portion; and
   a hydraulic sealing body comprising a perimeter wall defined between a radially inner surface and a radially outer surface, said perimeter wall is made of a crimpable ductile metallic material that is plastically deformed by crimping, said radially inner surface defining a through-cavity and an annular element projecting in a radially inner direction from said radially inner surface,
   said annular element is made of elastomeric material and comprises a first annular abutment surface configured to receive in a contact relationship a head portion of a coupling terminal and a second annular abutment surface, axially opposite to the first annular abutment surface, configured to receive in contact relationship an axial end of a hydraulic hose, wherein said annular element is inserted in said through-cavity of the hydraulic sealing body, and said first annular abutment surface is in contact with said head portion of the coupling terminal and said second annular abutment surface is in contact with said axial end of the hydraulic hose.

2. The hydraulic hose assembly according to claim 1, wherein said head portion of the coupling terminal comprises, at an axial end facing towards said insertion portion, an annular abutment surface arranged in contact relationship with said first abutment surface of the annular element of the hydraulic sealing body.

3. The hydraulic hose assembly according to claim 1, wherein said annular element of the hydraulic sealing body defines a central opening having a diameter smaller than a dimension in the radial direction of the head portion of the coupling terminal and greater than a dimension in the radial direction of the insertion portion of the coupling terminal.

4. The hydraulic hose assembly according to claim 1, wherein said head portion of the coupling terminal comprises a connection surface arranged at an axial end of the head portion opposite to the insertion portion; said connection surface being axially outer with respect to the hydraulic sealing body.

5. The hydraulic hose assembly according to claim 1, comprising a clamping screw slidably couplable with said hydraulic hose and configured to contact and crimp said hydraulic sealing body.

6. A hydraulic sealing body for bicycle hydraulic braking systems, the sealing body comprising a perimeter wall defined between a radially inner surface and a radially outer surface, said perimeter wall is made of a ductile metallic material that is plastically deformed by crimping, said radially inner surface defining a through-cavity and an annular element projecting in a radially inner direction from said radially inner surface, said annular element is made of elastomeric material and comprises a first annular abutment surface configured to receive in a contact relationship a head portion of a coupling terminal and a second annular abutment surface, axially opposite to the first annular abutment surface, configured to receive in contact relationship an axial end of a hydraulic hose, wherein said annular element is inserted in said through-cavity of the hydraulic sealing body.

7. The hydraulic sealing body according to claim 6, wherein said radially inner surface defines a first opening for insertion of a head portion of a coupling terminal and a second opening for insertion of an axial end of a hydraulic hose.

8. The hydraulic sealing body according to claim 7, wherein said perimeter wall has a thickness at the annular element greater than the thickness at the first and second openings.

9. The hydraulic sealing body according to claim 8, wherein said annular element is arranged in an intermediate axial position between the first and the second openings.

10. The hydraulic sealing body according to claim 9, wherein said annular element is made in one piece with said radially inner surface.

11. The hydraulic sealing body according to claim 8, wherein said annular element is made in one piece with said radially inner surface.

12. The hydraulic sealing body according to claim 7, wherein said annular element is arranged in an intermediate axial position between the first and the second openings.

13. The hydraulic sealing body according to claim 7, wherein said annular element is made in one piece with said radially inner surface.

14. The hydraulic sealing body according to claim 6, wherein said annular element is made in one piece with said radially inner surface.

15. The hydraulic sealing body according to claim 6, comprising, on said radially inner surface, an annular groove engaged by an annular projection of said annular element.

16. The hydraulic sealing body according to claim 6, wherein said annular element is made of rubber.

17. A kit for connecting a bicycle hydraulic hose to one of an actuator or a hydraulic connector, the kit comprising:
    a coupling terminal comprising an insertion portion insertable in a hydraulic hose and a head portion arranged at an axial end of the insertion portion and projecting in a radially outer direction from said insertion portion;
    a hydraulic sealing body comprising a radially inner surface defining a through-cavity and an annular element projecting in a radially inner direction from said radially inner surface; said annular element of the hydraulic sealing body comprising a first annular abutment surface configured to receive in contact relationship said head portion of the coupling terminal and a second annular abutment surface, axially opposite to the first, configured to receive in contact relationship said axial end of the hydraulic hose; and,
    a clamping screw configured to contact said hydraulic sealing body.

18. A method for assembling a hydraulic hose assembly comprising:
    providing a hydraulic sealing body having a through-cavity in which an annular element is arranged projecting in a radially inner direction comprising a first annular abutment surface, a second annular abutment surface axially opposite to the first annular abutment surface and a central hole;
    providing a coupling terminal having a head portion and an insertion portion;
    providing a hydraulic hose having an axial end;
    inserting the coupling terminal in the through-cavity of the hydraulic sealing body so that the insertion portion crosses the central hole;
    inserting the insertion portion of the coupling terminal in the axial end of the hydraulic hose so that the head portion of the coupling terminal contacts the first annular abutment surface of the hydraulic sealing body and the axial end of the hydraulic hose contacts the second annular abutment surface of the hydraulic sealing body.

* * * * *